Sept. 12, 1950     A. H. CRAPSEY, JR., ET AL     2,521,903
STRAP END ATTACHING DEVICE
Filed July 12, 1947
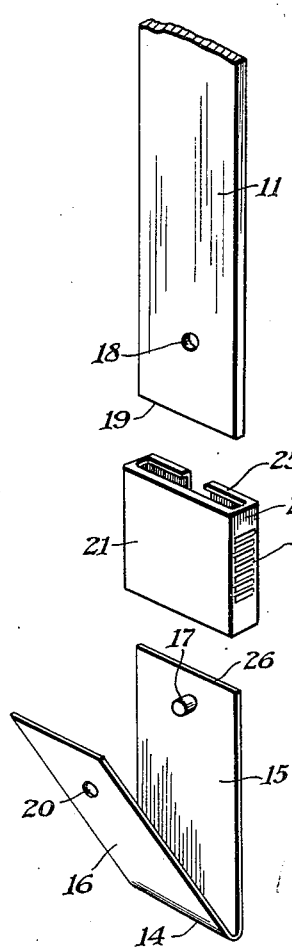
FIG. 1.
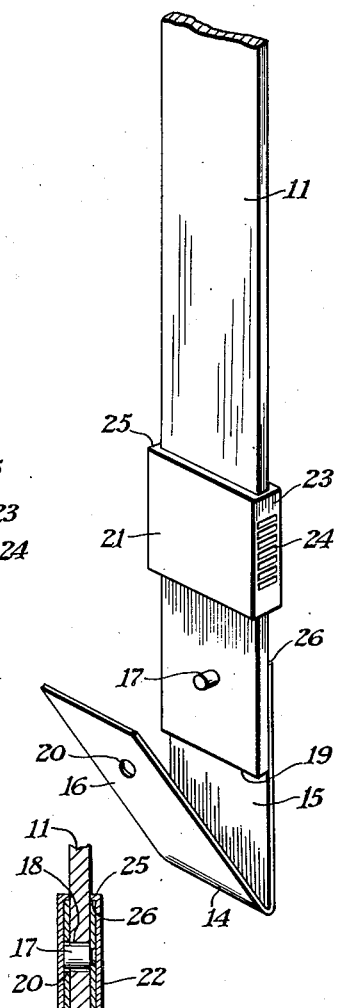
FIG. 2.
FIG. 4.
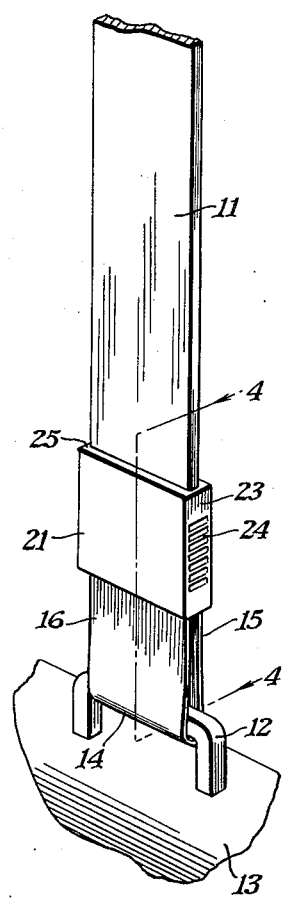
FIG. 3.
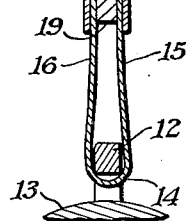
ARTHUR H. CRAPSEY, JR
KENNETH A. VAN DYCK
INVENTORS Patented Sept. 12, 1950

2,521,903

UNITED STATES PATENT OFFICE 2,521,903

STRAP END ATTACHING DEVICE

Arthur H. Crapsey, Jr., and Kenneth A. Van Dyck, Rochester, N. Y., assignors to Eastman Kodak Company, Rochester, N. Y., a corporation of New Jersey Application July 12, 1947, Serial No. 760,542

3 Claims. (Cl. 24—265)

The present invention relates to a strap fixture, and more particularly to a fixture for connecting a carrying strap to a camera or similar object.

The invention has as its principal object the provision of a fixture of this class which is simple, easy to attach, and of rugged construction.

A further object of the invention is the provision of a fixture, the parts of which are retained securely in assembled relation, yet may be easily and quickly taken apart and disconnected from the strap when desired.

To these and other ends, the invention resides in certain improvements and combinations of parts, all as will be hereinafter more fully described, the novel features being pointed out in the claims at the end of the specification.

In the drawings:

Fig. 1 is a perspective view showing the relation of the strap and the fixture parts prior to assembly;

Fig. 2 is a view similar to Fig. 1, showing the fixture partly attached to the strap;

Fig. 3 is a view similar to Figs. 1 and 2 showing the entire assembled fixture connected to the camera or other similar object; and Fig. 4 is a longitudinal sectional view taken substantially in line with 4—4 of Fig. 3, showing the relation of the fixture parts when in assembled relation.

The present invention is embodied, in the present instance by way of illustration only, in a fixture for attaching a carrying strap 11 to a ring or loop 12 secured to a camera 13 or other similar object so that the camera may be readily carried, as is apparent from inspection of Fig. 3.

The fixture of the present invention comprises a strip of spring metal, such as phosphor bronze, which is bent at its mid-point to provide a U-shaped member having a loop 14 adapted to receive the ring 12, as shown in Figs. 3 and 4. The member is provided with a pair of upwardly extending legs 15 and 16 of substantially equal length and arranged to lie in contact with the opposite faces of the strap 11, as illustrated in Fig. 4. The leg 15 is provided with an inwardly extending rivet 17 which is adapted to extend through an aperture 18 formed in the strap 11 adjacent the end 19 thereof. The rivet 17 is of such a length as to pass entirely through the strap and to project from the opposite side thereof, see Fig. 4. When the legs 15 and 16 are pressed together so as to engage the strap, in a manner to be later described, the rivet 17 will extend into an opening 20 formed in the leg 16, the opening 20 being slightly larger than the rivet to afford clearance therefor, as illustrated in Fig. 4. Thus, the rivet 17 extends entirely through the strap and into the leg 16.

As the U-shaped member is formed of a spring metal, the legs 15 and 16 will tend to spring or spread apart to the position shown in Figs. 1 and 2. It is apparent that in this spread position, the strap 11 will not be connected securely to the U-shaped member or the ring 12. In order that the strap will be securely held, the legs 15 and 16 are pressed or held together in the position shown in Fig. 4. To secure this result, the present invention provides a hollow sleeve formed from a strip of sheet metal bent to provide front and back walls 21 and 22 respectively and end walls 23. The latter are provided with roughened surfaces 24 to facilitate sliding of the sleeve longitudinally of the strap as will be later pointed out. The sleeve is positioned on the strap 11 above the U-shaped member, as shown in Fig. 2, and, when the leg 16 is moved to engage the strap, the sleeve is slid downwardly to overlie the legs and to cover the rivet 17 and the opening 20, as best shown in Fig. 4.

Due to the springy nature of the legs 15 and 16, they tend to move outwardly, but when the sleeve is in the overlying relation, as shown in Figs. 3 and 4, the legs press tightly against the inner surfaces of the walls 21 and 22 to provide a frictional contact between the legs and the sleeve. This frictional contact provides the sole means for retaining the sleeve in its overlying position to retain the legs in strap-engaging relation. In order to position the sleeve on the legs, the upper edge of the wall 22 is bent inwardly to provide a lip or ridge 25 which provides an abutment or stop which is arranged to engage the upper end 26 of the leg 15 as the sleeve is slid downwardly over the legs to thus properly position the sleeve. Thus the lip 25 and the end 26 position the sleeve over the legs, while the latter, due to their frictional contact with the sleeve, retain the latter in position. If desired, a similar lip also may be provided on the upper edge of the wall 21.

In assembling the fixture, the leg 16 is first slipped under the ring 12 and the rivet 17 is then inserted through the aperture 18. The leg 16 is then pressed against the strip 11 so that the rivet will extend through the aperture 18 of the strap 11 and into the opening 20. With the legs 15 and 16 in their pressed position, the sleeve is slid downwardly to overlie the legs, as shown in Figs. 3 and 4. As the rivet is carried by legs 15 and 16 and extends through the aperture 18 and into the opening 20, the weight of the camera 13, or other object, will be transmitted by the rivet to both legs 15 and 16 to equalize the load thereon.

While one embodiment of the invention has been disclosed, it is to be understood that the inventive idea may be carried out in a number of ways. This application is, therefore, not to be limited to the precise details disclosed, but is intended to cover all variations and modifications thereof formed within the scope of the appended claims.

We claim:

1. A strap fixture, for use with a strap having an aperture adjacent and end thereof, comprising, in combination, a U-shaped member formed of spring metal extending over said end and provided with a pair of spaced legs adapted to overlie opposite faces of said strap, one of said legs being formed with a rivet adapted to extend through said aperture to secure said member to said strap, the other of said legs being formed with a registering opening to receive the end of said rivet, a sleeve slidable on said strap and movable longitudinally thereof to overlie said legs and to cover said rivet and opening, said legs moving outwardly to engage inner surfaces of said sleeve to retain the latter frictionally in position to overlie said legs, and an inturned edge formed on the upper end of said sleeve adapted to engage an end of one of said legs to afford a stop for said sleeve to position the latter relative to said legs.

2. A strap fixture, for use with a strap having an aperture adjacent an end thereof, comprising, in combination, a U-shaped member formed of spring metal extending over said end and provided with a pair of spaced legs adapted to overlie opposite faces of said strap, one of said legs being formed with a rivet adapted to extend through said aperture to secure said member to said strap, the other of said legs being formed with a registering opening to receive the end of said rivet, a sleeve slidable on said strap and movable longitudinally thereof to overlie said legs and to cover said rivet and opening, said legs tending to spring apart to engage inner surfaces of said sleeve to hold the latter frictionally in position over said legs, and an inturned edge on said sleeve adapted to engage an end of one of said sleeves to position the sleeve.

3. A strap fixture, for use with a strap having an aperture adjacent an end thereof, comprising, in combination, a U-shaped member formed of spring metal extending over said end and provided with a pair of spaced legs adapted to overlie opposite faces of said strap, one of said legs being formed with a rivet adapted to extend through said aperture and to project from the opposite side of said strap to secure said member to said strap, the other of said legs being formed with a registering opening to receive the projecting end of said rivet, said legs tending to spring apart to disengage said strap, a hollow sleeve member slidable over said legs to compress the latter to retain said rivet in said aperture and said opening and with the legs pressing against and frictionally engaging inner surfaces of said sleeve and providing the sole means for retaining the sleeve in overlying relation to said legs, and an inturned lip formed on the upper edge of said sleeve positioned to engage an end of one of said legs to provide an abutment to limit the movement of said sleeve to position the latter to hold the legs in strap engaging relation and to cover said rivet.

ARTHUR H. CRAPSEY, Jr.
KENNETH A. VAN DYCK.

REFERENCES CITED

The following references are of record in the file of this patent:

UNITED STATES PATENTS

| Number | Name | Date |
|---|---|---|
| 1,408,922 | Baker | Mar. 7, 1922 |

FOREIGN PATENTS

| Number | Country | Date |
|---|---|---|
| 24,986 | Great Britain | Aug. 28, 1898 |